Nov. 6, 1945.   E. SIRP ET AL   2,388,621
ARTICLE WORKING APPARATUS
Filed April 30, 1943   3 Sheets-Sheet 1
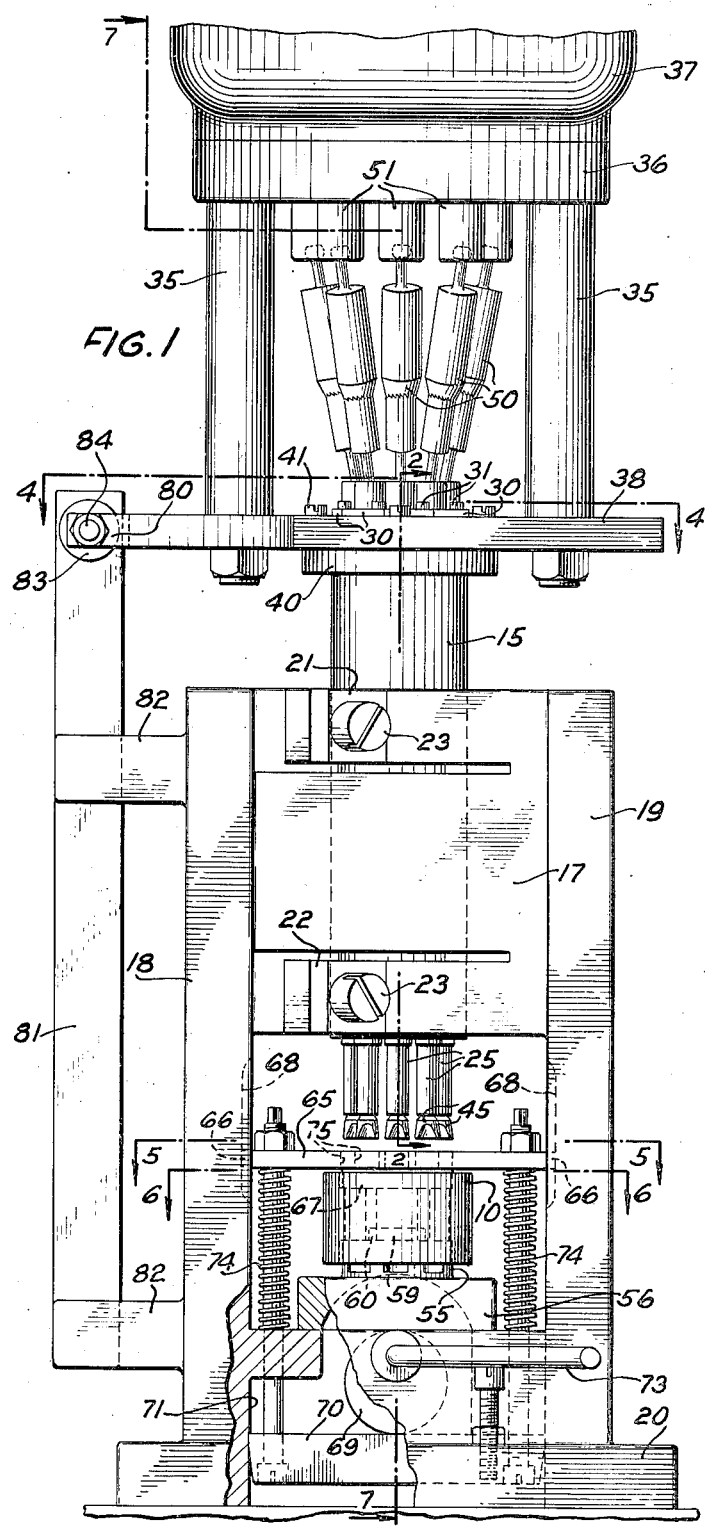
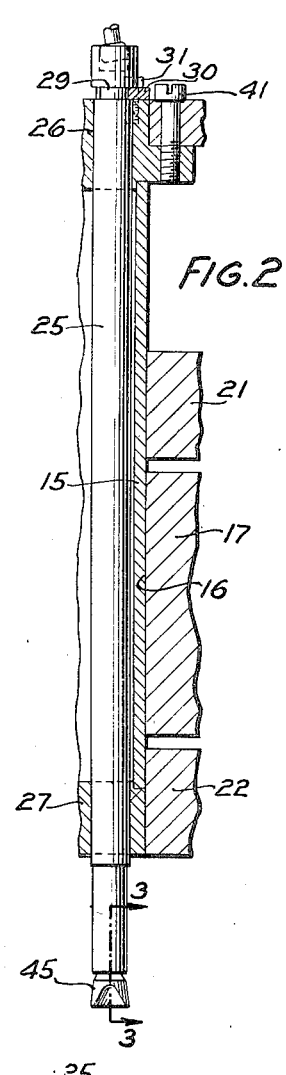
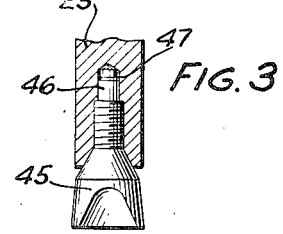
INVENTORS
E. SIRP
J. S. STULL
BY
Harry L. Daft
ATTORNEY

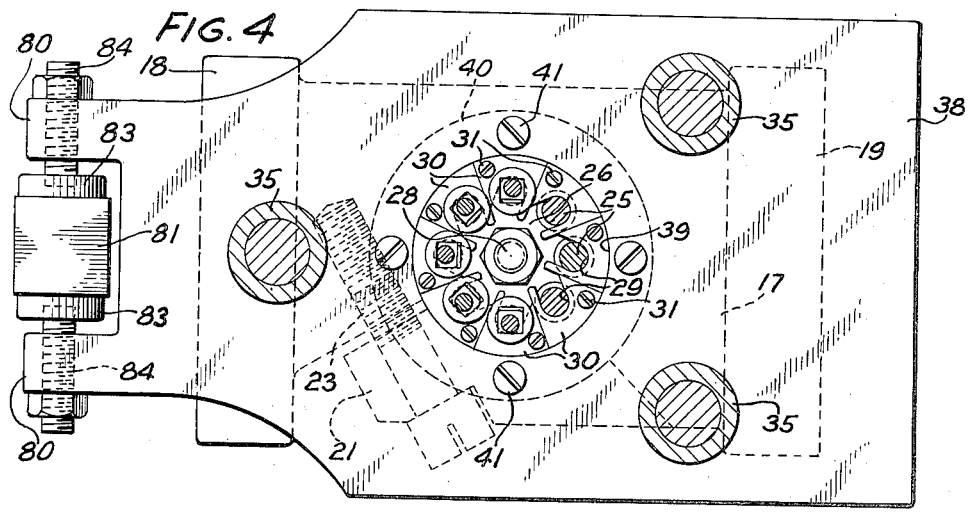
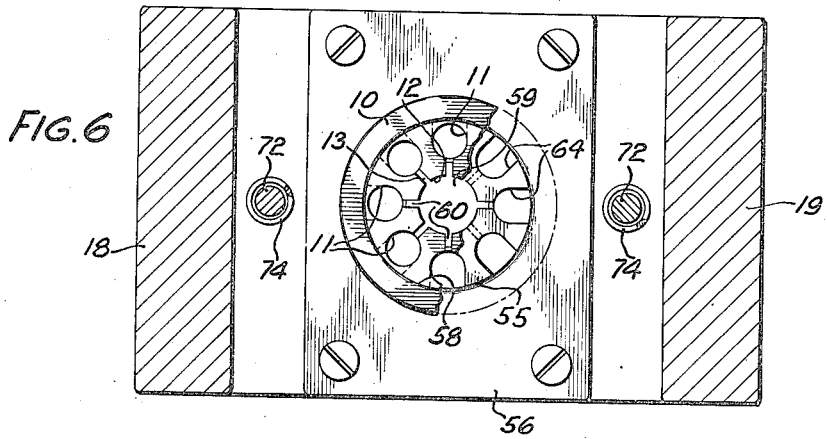
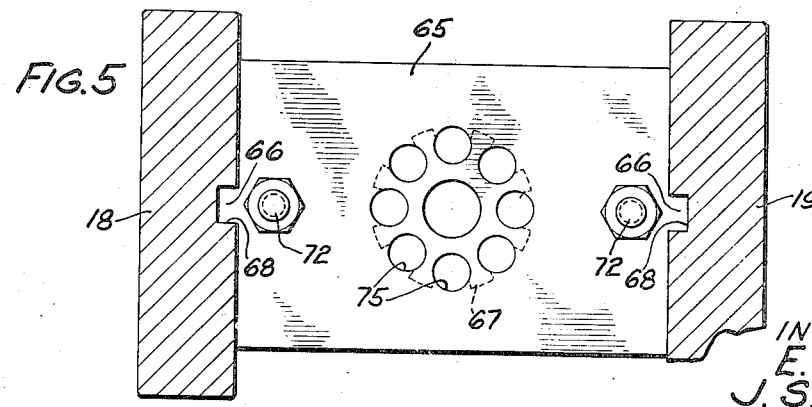

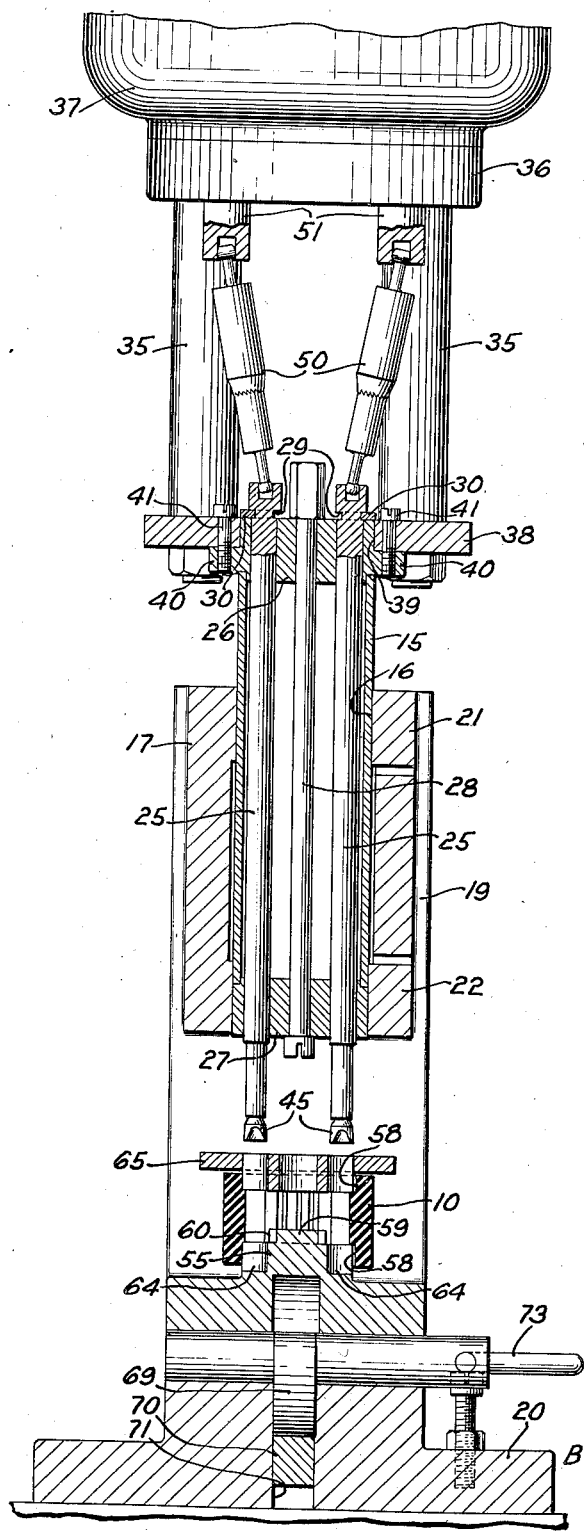

Patented Nov. 6, 1945

2,388,621

UNITED STATES PATENT OFFICE 2,388,621

ARTICLE WORKING APPARATUS

Emil Sirp, Downers Grove, and John S. Stull, Chicago, Ill., assignors to Western Electric Company, Incorporated, New York, N. Y., a corporation of New York Application April 30, 1943, Serial No. 485,118

5 Claims. (Cl. 77—4)

This invention relates to article working apparatus and more particularly to high precision boring apparatus.

An object of the present invention is to provide an efficient and effective boring apparatus.

In accordance with one embodiment of this invention, an apparatus is provided having a plurality of cutting tools mounted on hard metal spindles which are journalled in hard metal bearings fixed in a movable tubular spindle housing. This housing is rotatably adjustable and axially movable with respect to a fixed article support.

Other objects and advantages of the present invention will be more apparent from the following detailed description taken in conjunction with the drawings, wherein Fig. 1 is a front elevation of a boring apparatus constructed in accordance with this invention;

Fig. 2 is an enlarged, fragmentary sectional view along the line 2—2 of Fig. 1;

Fig. 3 is an enlarged, fragmentary, sectional view along the line 3—3 of Fig. 2 showing the cutting tool;

Fig. 4 is an enlarged, horizontal sectional view along the line 4—4 of Fig. 1;

Fig. 5 is an enlarged, horizontal sectional view along the line 5—5 of Fig. 1;

Fig. 6 is an enlarged, horizontal sectional view along the line 6—6 of Fig. 1; and Fig. 7 is a vertical sectional view along the line 7—7 of Fig. 1.

The present apparatus is designed to accurately bore eight radially spaced apertures in a cylindrically shaped article 10. Prior to the boring operation, a number of radially spaced apertures 11 of somewhat smaller diameter than the final diameter required and a central aperture 12 are drilled through the article 10. A number of radially extending slots 13 connect this central aperture with the radially spaced apertures 11.

In the embodiment of this invention shown in the drawings, a tubular spindle housing 15 is slidably positioned in a cylindrical aperture 16 of a partially split guide block 17 which is mounted between two upright supporting members 18 and 19, positioned at either side thereof. The lower ends of these supporting members are fixed to a base 20 of the apparatus. In order to permit adjustment of the clearance between the block 17 and the housing 15, as may be seen in Figs. 1 and 4, an upper portion 21 and a lower portion 22 of the block 17 are split off from the block 17, being integrally and resiliently attached thereto at one end, and connected to the block at their opposite ends by bolts 23 which are threaded into the main portion of the block. By tightening these bolts, these split-off portions 21 and 22 may be clamped against the block and the spindle housing, positioned therein, to take up any looseness in the fit therebetween.

Eight spindles 25 are journalled in disc shaped bearings 26 and 27 which are mounted in the upper and lower ends of the tubular housing 15, respectively, a reduced portion of each bearing extending a short distance within the housing, as shown in Fig. 7. The bearings are held in position in the housing by a threaded rod 28 which connects them and clamps them to either end of the housing. In order to prevent the spindles from moving axially with respect to the bearings and to hold the spindles in position in the bearings, an annular groove 29 is formed in the upper end of each spindle and when the spindle is assembled in the bearings, this groove is engaged by a small, suitably recessed plate 30 which is attached to the upper surface of the upper bearing by a threaded member 31. It will be apparent that, should it be necessary to remove a single spindle, only the associated plate need be removed and the single spindle can then be readily withdrawn without affecting the other spindles.

A support for the spindle housing is provided by three posts 35, the upper ends of which are fixed to a rotatable collar 36 of a reciprocable power head 37. These posts extend downwardly and their lower ends are fixed to a rectangular plate 38 in the mid-portion of which an aperture 39 is formed to receive the upper portion of the upper bearing 26. The upper surface of a flange 40, integrally formed with the bearing 26 and extending circumferentially about the bearing, is then positioned beneath the rectangular plate 38 and is attached thereto by a number of bolts 41 which are mounted in the plate 38 and threadedly engage the flange 40.

The lower end of each spindle is provided with a cutting tool 45 which is threaded therein. As may be seen in Fig. 3, a pilot member 46 is integrally formed with the threaded portion of each cutting tool 45 and extends into a recessed portion 47 of each spindle, thus accurately aligning the cutting tool with the spindle and preventing any possible movement of the cutting tool with respect to the spindle during the boring operation.

The cutting tools are rotated by universal connecting members 50 which connect the upper ends of the spindles 25 to power shafts 51 mounted in the power head 37. These universal connecting members are of the ratchet type and are described in detail in the co-pending application of E. Sirp, Serial No. 485,117, filed April 30, 1943.

During the operation of this apparatus, the cutting tools may become dull or may encounter burrs which may reduce the boring rate of one or more of the cutting tools. Since the tools are moved downwardly as a unit, should one cut less rapidly than the others, the increased resistance might cause damage to that tool or to the whole apparatus. Thus, these connecting members have been designed so that when the resistance to rotation exceeds a certain predetermined amount, the ratchet will slip and the associated cutting tool will no longer be rotated. In addition, the slipping of the ratchet causes a noise which serves as a signal to attract the attention of the operator. The operator may then stop the machine.

The article to be bored is positioned beneath the cutting tools 45 on a cylindrical block 55 which is mounted on a platform 56, integrally formed with the base 20 of the apparatus. The block 55 is formed so that it extends into the lower of a pair of circular recesses 58 formed in either end of the cylindrical article 10 which this apparatus is designed to bore. The block 55 is only slightly smaller in diameter than the recess and fits very closely therein to prevent any movement of the article once positioned on the block.

In order to prevent rotation of the article on the block 55 and to assure alignment of the apertures 11 in the block with the cutting tools 45, a keying member 59 having a number of arms 60 integrally formed therewith and extending therefrom to form a cross is mounted on the upper surface of the cylindrical block so that, when the article is mounted on the block 55, a number of the slots 13, which connect the central aperture 12 with the radially spaced apertures 11, will be engaged thereby.

In order to permit the cutting tools to cut all the way through the article 10, eight slots 64, as shown in Fig. 6, are formed in the outer surface of the block 55 and are circumferentially positioned so that when the article is placed on the block and aligned with the cutting tools, the slots 64 in the block 55 will be immediately beneath the apertures 11 in the article 10. The slots 64 are large enough to permit the cutting tools to cut through the apertures in the article 10 without engaging the block 55.

The article is locked in place in the block 55 during the boring operation by a cross plate 65 which is keyed to the upright members 18 and 19 by lugs 66 which engage vertically extending slots 68 formed in the inner side of each upright member. A disc shaped member 67 is integrally formed with the lower side of the plate 65 and fits into the recess 58 in the upper end of the article 10. The plate is clamped in position on an article by a rotatable cam 69 which bears against a bar 70 positioned in a rectangular recess 71 formed in the lower portion of the platform 56. The bar 70 is connected to the plate 65 by a pair of rods 72. Rotation of the cam 69 by a lever arm 73 fixed thereto to bring the camming surface into engagement with the bar 70 forces the plate 65 downwards and against the upper surface of the article resting on the block 55. A helically coiled spring 74 is associated with each rod 72 and serves to elevate the plate 65 from the article when the cam is released at the end of each boring operation. A number of apertures 75 are formed in the plate 65 and are suitably positioned to permit the cutting tools 45 to pass through the plate 65 without contacting the same during the boring operation.

As stated hereinbefore, this apparatus is intended to bore apertures in an article with great accuracy. An important feature of the present invention resides in the use of an extremely hard material, such as nitralloy, for the spindles 25 and a hard alloy steel for the bearings 26 and 27. The spindles are fitted as closely as feasible to the bearings to avoid any possibility of play therebetween. By using nitralloy for the spindles and a hard alloy steel for bearings, it has been found that no oil is required to lubricate the surfaces and that the amount of wear is negligible while the alignment of the spindles is maintained over long periods of operation without substantial change.

Since the guide block 17 and the article supporting block 55 are carefully aligned with each other and rigidly mounted on a common base 20, it will be apparent that axial alignment of the spindle housing, which is slidably mounted in the guide block 17, with respect to an article positioned on the block 55, is assured. In the present apparatus, however, a rotational adjustment of the spindle housing to align the spindles journalled therein and the cutting tools 45, associated with these spindles, with the radially spaced apertures 11 in the article to be bored, is provided to enable correction of minor misalignments of the cutting tools with these apertures.

Two projecting members 80, integrally formed with the rectangular plate 38, which is fixed to the upper end of the spindle housing 15, as explained hereinbefore, extend from one end of this plate, as shown in Figs. 1 and 4, and are positioned on either side of a rigidly mounted, vertically extending bar 81, of substantially square cross section. This bar is mounted on two vertically spaced brackets 82 which are fixed to the left side of the left, upright supporting member 18, the bar, brackets and member 18 being welded or otherwise rigidly attached together to ensure rigidity. The inner sides of the projecting members 80 are spaced from the sides of the bar 81 to permit discs 83, mounted on threaded shafts 84, which are threaded into the projecting members 80, to be positioned on either side of the bar 81 and to slidably contact the same. These discs 83 bear against the sides of the bar 81 and, as the spindle housing and associated apparatus are moved downwardly by the reciprocable power head 37 which is reciprocated by means, not shown, the discs slide along the sides of the bar 81 and prevent rotative movement of the housing and associating cutting tools.

Hereinbefore, it was stated that the collar 36 to which the rectangular plate 38 is attached is rotatable, being rotatable about an axis coinciding with the center of the article supporting block 55 and spindle housing 15. By adjusting the threaded shafts 84 on which the discs 83 are mounted, it will be apparent that the plate 38 and the spindle housing 15, supported thereby, may be rotated, consequently rotating the cutting tools with respect to the fixed article supporting block 55 and an article 10 which may be positioned thereon. Thus, minor corrections in the alignment of the cutting tools with the apertures 11 of the article to be bored may be readily effected.

While this invention has been described in connection with a boring apparatus, it will be apparent that the invention may also be applied, without substantial modification and without departing from the spirit or scope of the invention, to many other types of apparatus, and particularly to drilling apparatus wherein high precision must be maintained.

What is claimed is:

1. In a boring apparatus, a plurality of spindles, a cylindrical housing, a bearing block supported at each end on said housing for rotatably supporting said spindles leaving the intermediate portions of said spindles free, said spindles extending out of said housing at either end, cutting tools attached to one end of said spindles, and means for driving said spindles connected to the opposite ends thereof, a base having a work support thereon, a guide block on said base for reciprocably supporting said cylindrical housing, and means for guiding said cylindrical housing in said guide block to maintain a predetermined angular relationship therebetween.

2. In a boring apparatus, a plurality of spindles, an elongated cylindrical spindle housing, a hard metal alloy bearing block at each end of said housing for rotatably supporting said spindles, said spindles extending out of said housing at either end, cutting tools attached to one end of said spindles, means for driving said spindles connected to the opposite ends thereof, a base having a work support thereon, a guide block on said base for reciprocably supporting said cylindrical spindle housing, and means for adjusting said guide block to permit free reciprocation of said spindle housing while keeping to a minimum radial displacement of said spindle housing.

3. In a boring apparatus, a plurality of spindles, an elongated cylindrical spindle housing, a bearing block at each end of said housing for rotatably supporting said spindles leaving the intermediate portions of said spindles free, said spindles extending out of said housing at either end, cutting tools attached to one end of said spindles, and means for driving said spindles connected to the opposite ends thereof, a base having a work support thereon, an adjustable guide block on said base for reciprocably guiding said spindle housing, means for rotatably supporting said spindle housing, a bar fixed to said base and extending parallel to the path of reciprocation of said housing, an arm fixed to one end of said spindle housing, and an adjustment associated with said arm in engagement with aforesaid parallel bar to adjust the rotative position of said spindle housing.

4. In a boring apparatus, an elongated cylindrical spindle housing, a plurality of spindles in said housing, bearings at either end of said housing for journaling said spindles, an annular groove formed in said spindles, and bifurcated plates fixed to said spindle housing to individually hold each spindle permitting easy access and removal of any spindle.

5. In a boring apparatus, a plurality of spindles made of a hard metal alloy, an elongated cylindrical spindle housing, a bearing block made of hard metal alloy at each end of said housing for rotatably supporting said spindles leaving the intermediate portions of said spindles free, said spindles extending out of said housing at either end, cutting tools attached to one end of said spindles, means for driving said spindles connected to opposite ends thereof, a base having a work support thereon, a guide block on said base for reciprocably supporting said cylindrical housing and means for guiding said cylindrical housing in said block to maintain a predetermined angular relationship therebetween.

EMIL SIRP.
JOHN S. STULL.